United States Patent
Drewes et al.

(10) Patent No.: US 9,464,679 B2
(45) Date of Patent: Oct. 11, 2016

(54) BRAKE SYSTEM OF A DRUM BRAKE

(71) Applicant: SAF-HOLLAND, GmbH, Bessenbach (DE)

(72) Inventors: Olaf Drewes, Aschaffenburg (DE); Frederik Biewer, Hailbach (DE)

(73) Assignee: SAF-HOLLAND GmbH, Bessenbach (DE)

( * ) Notice: Subject to any disclaimer, the term of this patent is extended or adjusted under 35 U.S.C. 154(b) by 0 days.

(21) Appl. No.: 14/354,804

(22) PCT Filed: Dec. 13, 2012

(86) PCT No.: PCT/EP2012/075332
§ 371 (c)(1),
(2) Date: Apr. 28, 2014

(87) PCT Pub. No.: WO2013/087746
PCT Pub. Date: Jun. 20, 2013

(65) Prior Publication Data
US 2014/0305752 A1    Oct. 16, 2014

(30) Foreign Application Priority Data

Dec. 16, 2011    (DE) .................. 10 2011 088 847

(51) Int. Cl.
*F16D 51/18*    (2006.01)
*F16D 65/09*    (2006.01)
*F16D 125/66*    (2012.01)
*F16D 51/62*    (2006.01)

(52) U.S. Cl.
CPC .............. *F16D 65/09* (2013.01); *F16D 51/18* (2013.01); *F16D 51/62* (2013.01); *F16D 2125/66* (2013.01)

(58) Field of Classification Search
CPC ........ F16D 65/09; F16D 65/22; F16D 51/15; F16D 51/62; F16D 2125/66
USPC ...................... 188/335, 206 R, 368
See application file for complete search history.

(56) References Cited

U.S. PATENT DOCUMENTS

| | | | | |
|---|---|---|---|---|
| 3,322,241 A | * | 5/1967 | Cox et al. ...................... | 188/170 |
| 3,604,542 A | * | 9/1971 | Cullen ........................ | 188/368 |
| 3,666,061 A | * | 5/1972 | Nehr .......................... | 188/206 R |
| 5,273,139 A | * | 12/1993 | Kotarra et al. ............... | 188/362 |
| 5,630,354 A | * | 5/1997 | Hoffner ................... | B60T 17/08 |
| | | | | 188/366 |

FOREIGN PATENT DOCUMENTS

| | | |
|---|---|---|
| CN | 201425069 | 3/2010 |
| CN | 201461795 | 5/2010 |
| DE | 1455814 | 6/1969 |

(Continued)

OTHER PUBLICATIONS

European Patent Office, International Search Report, Mar. 7, 2013.

*Primary Examiner* — Melanie Torres Williams
(74) *Attorney, Agent, or Firm* — Price Heneveld LLP

(57) ABSTRACT

A brake system of a drum brake includes a carrier unit and a brake cylinder, wherein a connecting element is provided, which has a first connection section for fixing the brake cylinder and is fixed in a second connection section to the carrier unit wherein, the first connection section is arranged offset to the second connection section while being parallel relative to the wheel axis, and wherein the first connection section can be fixed directly to the brake cylinder in order to keep the distance between the center of gravity of the brake cylinder and the first connection section low.

20 Claims, 1 Drawing Sheet

(56) References Cited

FOREIGN PATENT DOCUMENTS

| FR | 1294262 | 4/1961 |
|----|---------|--------|
| GB | 1024449 | 3/1966 |
| GB | 1237302 | 6/1971 |
| GB | 1418630 | 12/1975 |
| GB | 1513740 | 6/1978 |
| GB | 1024449 | 3/1996 |

* cited by examiner

BRAKE SYSTEM OF A DRUM BRAKE

BACKGROUND OF THE INVENTION

The present invention relates to a brake system of a drum brake, comprising a carrier unit and a brake cylinder, in particular for use in commercial vehicles or utility vehicles.

Brake systems of wedge drum brakes are known in the prior art, wherein the wheel of a utility vehicle is slowed down by means of a brake drum rotating with the wheel and brake shoe elements engaging the brake drum. In order to fix the non-rotating components of the brake system to the frame of the utility vehicle, a carrier unit or a brake carrier is used in a known manner, which secures or supports for example components such as brake shoe elements or brake cylinders against displacement relative to the vehicle frame of the utility vehicle. Up to now, only brake cylinders especially designed for wedge drum brakes could be fixed to the carrier unit via a longish tube-shaped element, wherein in particular due to the high weight and the long lever arm, tremendous moments cause loads on and fatigue of the connection site of the brake cylinder on the carrier unit. Furthermore, the brake cylinders for wedge drum brakes are considerably more expensive compared to brake cylinders for disc brake systems since they are not manufactured in mass production processes.

The object underlying the present invention is to optimize the connection site of the brake cylinder on the carrier unit and, at the same time, to make it possible to use as brake cylinder also a standard brake cylinder, as it is used in disc brake systems, for example.

SUMMARY OF THE INVENTION

According to the invention, the brake system, which is in particular construed as a brake system of a wedge drum brake or a wedge drum brake system, comprises a carrier unit and a brake cylinder, wherein there is provided a connecting element having a first connection section for fixing the brake cylinder and being fixed to the carrier unit in a second connection section, wherein the first connection section is arranged offset to the second connection section while being parallel relative to a wheel axis, and wherein the first connection section can be fixed directly to the brake cylinder in order to keep the distance between the center of gravity of the brake cylinder and the first connection section low. Preferably, the brake cylinder is a pneumatically actuated brake cylinder, which transforms a compressive force of a compressed air system into a transversal movement or a longitudinal force and transmits it to a force transmission element. Preferably, the brake cylinder is formed essentially rotation-symmetric about a transmission axis, wherein its center of gravity particularly preferably is also arranged on the transmission axis. The position of the center of gravity of the brake cylinder is mainly determined by the components used in the brake cylinder, and the resulting weight distribution within the brake cylinder. The brake cylinder is not fixed directly to the carrier unit, but is fixed via the connecting element relative to the rigid, i.e. non-rotating components of the chassis system of the utility vehicle. In particular in case the carrier unit is preferably surrounded by a rotating brake drum, it is advantageous to arrange the brake cylinder such that it will not collide with the rotating brake drum. To this end, the connecting element has an extension along the transmission axis and is fixed to the carrier unit in a second connection section, wherein the brake cylinder may be fixed to a first connection section of the connecting element. The second connection section is preferably provided in that portion of the connecting element, in which the transmission axis intersects the carrier unit or a main extension plane of the carrier unit lying transversely to the wheel axis. Alternatively preferably, the second connection section may be defined as that portion of the connecting element, in which—along the transmission axis—there is provided a substantial change in cross-section (transversely to the transmission axis) in relation to a central portion of the connecting element, i.e. in which the connecting element preferably verges into the carrier unit. Said two arrangements are particularly advantageous when designing the brake as a wedge drum brake. A substance-to-substance bond or a bonded connection is preferred for fixing the connecting element to the carrier unit. In order to make it possible to easily mount and dismount the brake cylinder at the first connection section of the connecting element, there is provided a preferably releasable connection, either a form-fitting or positive connection or a frictional connection, between the brake cylinder and the connecting element. While the utility vehicle moves, strong vibrations or shocks may act from the brake cylinder onto the connecting element and the carrier unit and vice versa. In order to keep the moments generated hereby in the first connection section as low as is possible, it is preferred to arrange the supporting connection between the connection section and the brake cylinder as close as is possible to the center of gravity of the brake cylinder, wherein in this way the lever arm acting from the center of gravity of the brake cylinder to the first connection section remains as short as is possible. This is particularly advantageous when designing the brake as wedge drum brake. Preferably, however, further elements such as sealing or damping elements, which have no supporting function between the brake cylinder and the connecting element, may be arranged between the connecting element and the brake cylinder. The connecting element is connected to the carrier unit preferably by means of a substance-to-substance bond, wherein a substance-to-substance bond in general may be considered to be stronger and less prone to wear than a positive or frictional connection by means of a screw/bolt element, for example.

Particularly preferably, the connecting element forms an integral part of the carrier unit. This integral design of the connecting element and the carrier unit may be realized already during the manufacture of the two components, by designing them as a casting or a forged part. Alternatively preferably, it is also possible to fix the connecting element by means of a welded connection to the carrier unit. Since the connection area between the connecting element and the carrier unit has to absorb high forces and moments and since it has to transmit high forces and moments from the connecting element to the carrier unit, it is preferred to design the second connection section or the carrier unit in the area of the second connection section, for example by means of suitable roundings or material accumulations, in particular for a favorable flow of moments and forces or an optimum distribution of loads or stresses.

In a preferred embodiment, the distance $d_1$ of the center of gravity of the brake cylinder to the first connection section is in a relationship of 0.05 to 0.9, preferably 0.1 to 0.8, and particularly preferably 0.3 to 0.7 to the distance $d_2$ of the center of gravity of the brake cylinder from the second connection section. Preferably, the distance of the first connection section to the second connection section is the length or the extension of the connecting element along the transmission axis. Here, the weight or the inertia force of the brake cylinder acts departing from its center of gravity with a lever arm, which results from the sum of the distance of the center of gravity of the brake cylinder to the first connection section and the length of the connecting element. In order to keep the total lever arm as small as is possible, it is preferred that the center of gravity of the brake cylinder is arranged as close as is possible to the first connection section, wherein in particular the moments acting in the first connection section or between the first connection section and the brake cylinder may be kept low due to the short lever arm. The further away the center of gravity of the brake cylinder is arranged from the first connection section, the larger the moments or bending moments acting in the first connection section between the brake cylinder and the connecting element. The lower limit for this relationship of preferably 0.05 is characterized by a particularly short brake cylinder or a brake cylinder, which extends particularly little along the transmission axis in relation to a very long transmission element. However, it may also be preferred to use a large cylinder with a long length of stroke, wherein in this case the relationship of $d_1$ to $d_2$ is large. The preferred range of the relationship of the distance $d_1$ to the distance $d_2$ makes it possible to reach the right compromise between the optimum bending moment relationship at the connection sections and the optimum mounting position of the brake cylinder in the area of the wheel suspension. Preferably, a multiple of the bending moment acting on the first connection section acts on the second connection section. The mounting position of the brake cylinder preferably ensures a good accessibility for assembly work on the brake cylinder, ensures the required distance of the hydraulic lines connected to the brake cylinder from rotating components, and ensures that in the case of vibrations of the brake system there is little probability of resonances.

In a particularly preferred embodiment, the connecting element is at least over a certain area formed as a hollow body in order to accommodate or receive a transmission element, wherein the cavity of the connecting element extends essentially along a transmission axis. Preferably, the connecting element fulfills at least two main functions. On the one hand, it accommodates a transmission element and protects the area, in which the transmission element displaces, against the entry or influence of foreign matter. On the other hand, the connecting element supports the brake cylinder against the carrier unit or against a converter unit preferably fixed to the carrier unit. In this way, it is possible to transmit a force or a controlling torque, which is applied by the brake cylinder, via the transmission element to the converter unit or the wedge unit. To put it differently, the connecting element preferably serves to hold or fix the brake cylinder at a certain distance from the carrier unit or the converter unit.

Preferably, the transmission axis is inclined at an angle a relative to the wheel axis, wherein the angle α takes values in a range of 1° to 45°, preferably 5° to 30° and particularly preferably in a range of 7° to 15°. The wheel axis is preferably the main extension axis of the rigid axle of a utility vehicle and particularly preferably the axle about which an axle stub or axle journal of the bearing portion of an axle stub is formed in a rotation-symmetric manner. Particularly preferably, the wheel axis corresponds also to the axis of rotation, about which the wheel of the utility vehicle rotates, wherein together with the wheel a brake drum rotates about the wheel axis. The transmission axis is preferably the axis, in which the brake cylinder transmits its force to the converter unit, i.e. in other words preferably the axis, along which the transmission element displaces. In order to facilitate the assembly and so as not to impede the functioning of the brake cylinder by further additional parts of the chassis systems such as the rigid axle and the rotating brake drum, it is preferred to incline the transmission axis relative to the wheel axis. It has proven to be advantageous to choose the angle of inclination of the transmission axis relative to the wheel axis in a range of 1° to 45°. An angle of 7° to 15° is particularly advantageous and space-saving, wherein the danger that the brake cylinder collides with the rotating parts of the chassis is low.

Further preferably, there is provided at least one sealing element in order to protect the connection area between the brake cylinder and the connecting element and/or the cavity of the connecting element and/or the brake cylinder against the entry of foreign matter. In a first preferred embodiment, said sealing element may for example be designed as an elastic O ring made from rubber, which is arranged between the contact surfaces of the brake cylinder and the first connection section. Thus, it may be prevented that foreign matter enters into the hollow space of the connecting element or into the brake cylinder at the contact point between the brake cylinder and the connecting element. Alternatively or additionally preferably, the sealing element may be designed as a bellows, which at least partially surrounds the transmission element and is supported on the converter unit or the transmission element and on the brake cylinder and prevents that foreign matter comes to the transmission element or into the brake cylinder.

Particularly preferably, between the first connection section and the brake cylinder, there is provided a damping element so as to reduce the transmission of shocks and vibrations from the carrier element to the brake cylinder and vice versa. Preferably, the damping element may be a disc-shaped element made from rubber or from an elastic material, which element is inserted between the contact surfaces of the connection section and the brake cylinder and clamped between both components. Further preferably, the damping element may be a disc or block made of an elastic metal. Preferably, the damping element serves to vibration-mechanically decouple the brake cylinder from the connecting element or from the carrier unit, respectively. Alternatively, there may be provided a damping element made from a plastically deformable material, which is in particular suitable to absorb heavy shocks from the brake cylinder or on the brake cylinder in order to protect elementary components of the brake cylinder and of the connecting element from damage. In this preferred embodiment, the damping element is designed as an expandable part, which has to be replaced only when damaged or worn. Preferably, a ductile metal is used for a plastically deformable damping element.

Further preferably, the first connection section is designed as a flange and comprises cavities, which may be engaged by fastening means in order to fix the brake cylinder to the connecting element. The connection section or the first connection section of the connecting element may preferably be collar-shaped, wherein fastening means may engage or pass through the collar-shaped portion of the connection section extending essentially transversely to the transmission axis, in order to fix the brake cylinder to the connecting element. Preferred fastening means may be pins or bolt/screw elements with an external thread, for example, which engage respective internal threads on the connection section, on the brake cylinder or additionally provided nuts. In particular in case a damping element is provided between the first connection section and the brake cylinder, also the fastening means preferably have a certain degree of elasticity so that when there is a vibration between the brake cylinder and the connection section, the fastening means will not be unscrewed or released. Alternatively preferably, the fastening means may also be secured by means of splints so that they are not released or unscrewed. Particularly preferably, the fastening means may form an integral part of the brake cylinder and pass through cavities on the connection section so as to engage nuts on the side of the first connection section, which is opposite the brake cylinder.

Advantageously, the second connection section has an anticlastically curved outer contour. The anticlastic curvature preferably reduces the occurrence of a notching effect when the second connection section is subjected to a bending load or a tensile load. A surface is defined as being anticlastically curved if it has a curvature about a first main axis, in the present case preferably the transmission axis, and a second curvature, which runs transversely to said first curvature and is concave in cross-section. To put it differently, the second connection section in the area between the carrier unit and the connecting element has a hyperboloid shape or a saddle-like surface geometry. Furthermore, the anticlastic curvature is characterized in that the transition of the outer surfaces of the second connection section into the carrier unit or into the connecting element, respectively, runs essentially tangentially to their respective surfaces. A thus designed second connection section allows for a particularly even progress of stress or an even distribution of stress in the material both of the carrier unit and of the connecting element. Thus, preferably, the service life and the maximum possible bending moments increase.

In a further preferred embodiment, the connecting element has a cross-sectional thickness and/or wall thickness, which increase(s) along the transmission axis in the direction of the second connection section so as to achieve an even distribution of the bending load in the connecting element. For example, when there is a force due to the weight or due to vibrations applied to the brake cylinder, which force acts on the connecting element, the bending load in the connecting element will increase as the lever arm increases. In order to prevent that the bending load in the area of the second connection section reaches a value, which is larger than the maximum possible strength or bending strength of the manufacturing material of the connecting element, preferably the area moment of inertia, which is defined both by the geometric dimensions and the wall thickness of the connecting element, is increased. Thus, it is preferred that the extension of the connecting element transverse to the transmission axis is increased and/or the wall thickness of the connecting element increases in the course from the first connection section to the second connection section. Since thus the cross-sectional thickness or the wall thickness of the connecting element is optimally adapted to the bending loads occurring or to the forces to be absorbed, it is particularly preferably possible to save weight since there is no over-dimensioning of the connecting element.

In a further preferred embodiment, the first connection section has an undercut, which may be made to form-fittingly or positively engage a corresponding geometry of the brake cylinder. Preferably, there may be provided a bayonet lock, for example, where the brake cylinder is guided along the transmission axis against the connection section and by slightly turning it about the transmission axis or by rotating it about the transmission axis it comes into positive engagement with a respective undercut on the first connection section. It may be further preferred to fix the brake cylinder by means of additional fastening elements or an additional fastening element after said rotation position has been set. This embodiment is advantageous in particular in that it provides for a fast and simple assembly with only a few assembly steps.

Further advantages and features of the present invention become apparent from the following description of a preferred embodiment of the brake system according to the invention with reference to the appended Figures. Individual features of the embodiments shown may be combined within the framework of the invention. The Figures show:

DETAILED DESCRIPTION OF THE PREFERRED EMBODIMENTS

Figure 1:
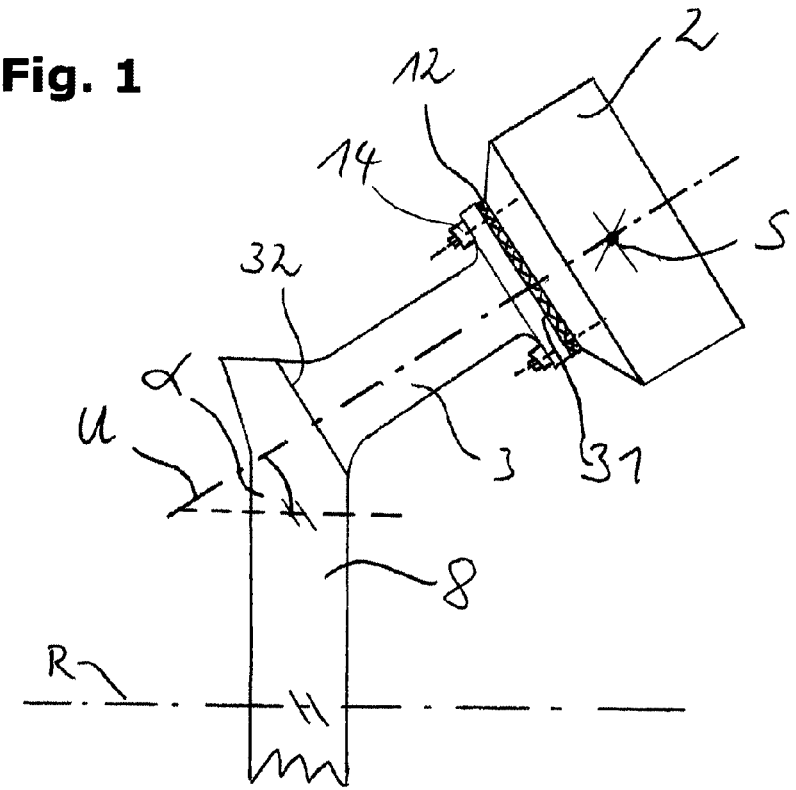
FIG. 1 shows a view of the brake system according to the invention.

FIG. 1 shows a preferred embodiment of the brake system according to the invention, comprising a carrier unit 8, a brake cylinder 2, and a connecting element 3. The connecting element 3 is preferably designed as an integral part of the carrier unit 8, wherein it is fixed to the carrier unit 8 in a second connection section 32. Furthermore, the connecting element 3 comprises a connection section 31, which particularly preferably is construed as a flange and serves for accommodating or fixing the brake cylinder 2. The carrier unit 8 preferably corresponds to the brake carrier of a known brake system and extends essentially transverse to a wheel axis R. The connecting element 3 extends essentially along a transmission axis U, which is inclined at an angle α relative to the wheel axis. The first connection section 31 of the connecting element 3 is preferably formed as a flange, wherein fastening means 14 may engage the first connection section 31 in order to fix the brake cylinder 2 to the connecting element 3. It is not shown that the connecting element 3 is preferably designed as a hollow body, wherein in a longish cavity of the connecting element 3 there is accommodated a transmission element 4. Between the first connection section 31 and the brake cylinder 2, there is arranged a damping element 12, wherein the damping element 12 may simultaneously also function as a sealing element. Furthermore, the center of gravity S of the brake cylinder 2 is shown, wherein said center of gravity S preferably lies on the transmission axis U.

Figure 2:
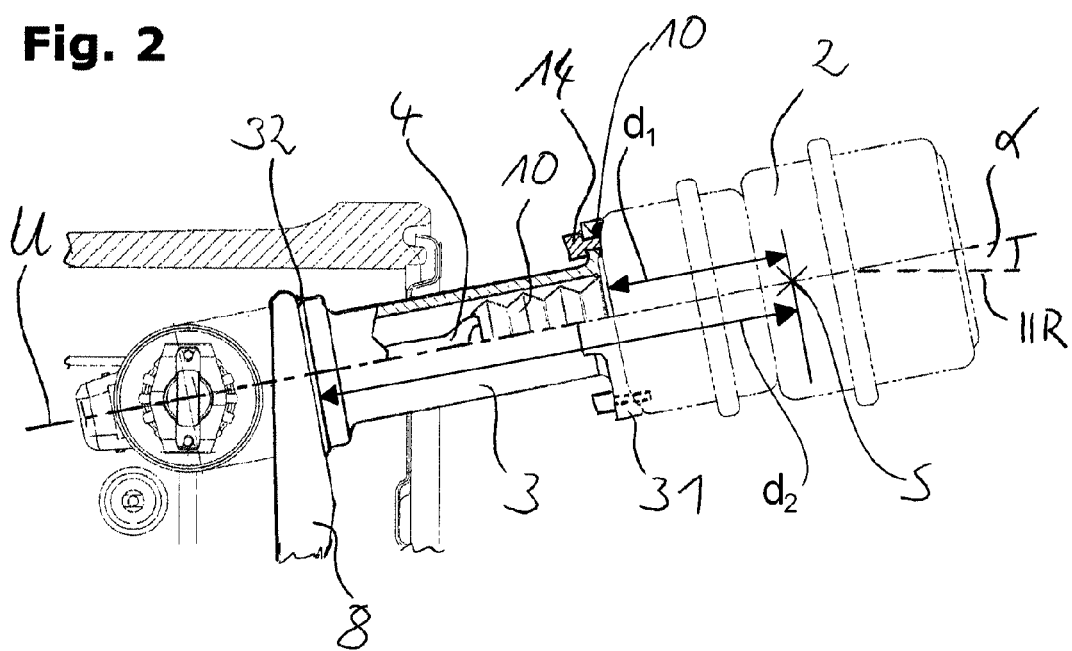
FIG. 2 shows a partially sectional view of a preferred embodiment of the brake system according to the invention.

FIG. 2 shows a partially sectional view of a preferred embodiment of the brake system according to the invention. In particular, the connecting element 3 is shown in a partially sectional representation. There are shown a transmission element 4 and a sealing element 10, which is construed as a bellows. A second sealing element 10 is exemplary designed as an O ring, which is arranged between the contact surfaces of the brake cylinder 2 and of the first connection section 31. The connecting element 3 is fixed to the carrier unit 8 in the second connection section 32 preferably by means of a substance-to substance bond, wherein the portion, in which it is fixed, has a preferably anticlastically rounded outer surface. The brake cylinder 2 transmits preferably a force along a transmission axis U to the transmission element 4, which displaces along the transmission axis U and transmits the force to the converter unit provided on the carrier unit at the left of the Figure in order to achieve in the converter unit a movement of two pistons transverse to the transmission axis U. Here, the transmission axis U is preferably inclined at an angle a relative to the wheel axis R. In the Figure, this is shown by an auxiliarily drawn dashed straight line, which runs parallel to the wheel axis R. The flange-like first connection section 31 of the connecting element 3 is particularly preferably suitable for accommodating fastening means 14, which in turn may engage the brake cylinder 2 so as to fix the latter to the connecting element 3. Particularly preferably, the fastening means 14 are screws/bolts or pin-shaped elements, which with their outer thread preferably engage an inner thread provided on the brake cylinder 2 and, thus, fix the brake cylinder 2 to the connecting element 3. There is further shown the distance $d_1$ of the first connection section 31 to the center of gravity of the brake cylinder, measured along the transmission axis U, and the distance $d_2$ of the second connection section to the center of gravity S of the brake cylinder. The relationship of the two distances $d_1$ and $d_2$ is an expression of the relationship of the lever arms of a force acting on the first and second connection sections 31, 32, respectively, such as the weight force of the brake cylinder 2, which acts in the center of gravity S. In the left half of the Figure, there is indicated a brake drum, which is arranged preferably rotatably about the carrier unit 8, wherein the connecting element 3 makes it possible to arrange or fix the brake cylinder 2 outside of the area of the brake drum. The converter unit, which is arranged to the left of the carrier unit 8, is preferably a wedge unit of a wedge brake drum, which serves to displace two brake shoe elements arranged within the brake drum relative to each other so that a braking process is initiated and friction between the brake shoe elements and the inside of the brake drum occurs. In an alternatively preferred embodiment, the converter unit may also pass through a cavity on the carrier unit 8 and be designed as an integral part of the connecting element 3, wherein the compound of converter unit and connecting element 3 may be fixed to the carrier unit 8 by means of a substance-to-substance bond.

LIST OF REFERENCE SIGNS

2—brake cylinder
3—connecting element
4—transmission element
8—carrier unit
10—sealing element
12—damping element
14—fastening element
31—first connection section
32—second connection section
$d_1$—distance
$d_2$—distance
R—wheel axis
S—center of gravity
U—transmission axis
α—angle

The invention claimed is:

1. A brake system of a drum brake, comprising:
a carrier unit;
a brake cylinder;
a connecting element having a first connection section fixed to the brake cylinder and a second connection section fixed to the carrier unit;
wherein the first connection section is arranged offset to the second connection section while being parallel relative to a wheel axis;
wherein the first connection section is configured to be fixed directly to the brake cylinder in order to keep a distance between the center of gravity of the brake cylinder and the first connection section low;
wherein a distance of the center of gravity of the brake cylinder to the first connection section is in a relationship of from about 0.3 to about 0.7 to a distance of the center of gravity of the brake cylinder to the second connection section; and
wherein between the first connection section and the brake cylinder there is a damping element that reduces the transmission of shocks and vibrations from the connecting element to the brake cylinder and vice versa.

2. The brake system of claim 1, wherein the connecting element is an integral part of the carrier unit.

3. The brake system of claim 2, wherein the connecting element comprises a hollow body at least over a certain area so as to accommodate or receive a transmission element, and wherein the cavity of the connecting element extends essentially along a transmission axis.

4. The brake system of claim 3, wherein the transmission axis is inclined at an angle relative to the wheel axis, and wherein the angle is in a range of about 1° to about 45°.

5. The brake system of claim 4, wherein the angle is in the range of 5° to 30°.

6. The brake system of claim 5, wherein the angle is in the range of 7° to 15°.

7. The brake system of claim 4, further comprising:
at least one sealing element configured to protect at least one of the connection area between the brake cylinder and the connecting element, the cavity of the connecting element, and the brake cylinder against the entry of foreign matter.

8. The brake system of claim 7, wherein the first connection section comprises a flange and cavities, configured to be engaged by a fastening structure so as to fix the brake cylinder to the connecting element.

9. The braking element of claim 8, wherein the second connection section includes an anticlastically curved outer contour.

10. The brake system of claim 7, wherein at least one of the cross-sectional thickness and the wall thickness of the connecting element increases along the transmission axis in the direction of the second connection section in order to achieve an even distribution of the bending load in the connecting element.

11. The brake system of claim 10, wherein the first connection section includes an undercut, which is configured to positively or form-fittingly engage a corresponding geometry of the brake cylinder.

12. The brake system of claim 1, wherein the connecting element comprises a hollow body at least over a certain area configured to accommodate or receive a transmission element, and wherein the cavity of the connecting element extends essentially along a transmission axis.

13. The brake system of claim 12, wherein the transmission axis is inclined at an angle relative to the wheel axis, and wherein the angle is in a range of about 1° to about 45°.

14. The brake system of claim 13, wherein the angle is in the range of 5° to 30°.

15. The brake system of claim 14, wherein the angle is in the range of 7° to 15°.

16. The brake system of claim 12, further comprising:
at least one sealing element configured to protect at least one of the connection area between the brake cylinder and the connecting element, the cavity of the connecting element, and the brake cylinder against the entry of foreign matter.

17. The brake system of claim 1, wherein the first connection section comprises a flange and cavities, configured to be engaged by a fastening structure so as to fix the brake cylinder to the connecting element.

18. The braking element of claim 1, wherein the second connection section includes an anticlastically curved outer contour.

19. The brake system of claim 1, wherein at least one of the cross-sectional thickness and the wall thickness of the connecting element increases along the transmission axis in the direction of the second connection section in order to achieve an even distribution of the bending load in the connecting element.

20. The brake system of claim 1, wherein the first connection section includes an undercut, configured to positively or form-fittingly engage a corresponding geometry of the brake cylinder.

* * * * *